US008827655B2

(12) United States Patent
Bech (10) Patent No.: US 8,827,655 B2
(45) Date of Patent: *Sep. 9, 2014

(54) METHOD FOR PREPARING A PRE-FORM (75) Inventor: Anton Bech, Ringkøbing (DK)

(73) Assignee: Vestas Wind Systems A/S, Aarhus N. (DK)

( * ) Notice: Subject to any disclaimer, the term of this patent is extended or adjusted under 35 U.S.C. 154(b) by 1115 days.

This patent is subject to a terminal disclaimer.

(21) Appl. No.: 12/808,922

(22) PCT Filed: Dec. 18, 2008

(86) PCT No.: PCT/EP2008/067846
§ 371 (c)(1),
(2), (4) Date: Aug. 26, 2010

(87) PCT Pub. No.: WO2009/077582
PCT Pub. Date: Jun. 25, 2009

(65) Prior Publication Data
US 2010/0310380 A1 Dec. 9, 2010

Related U.S. Application Data (60) Provisional application No. 61/008,609, filed on Dec. 19, 2007.

(30) Foreign Application Priority Data

Dec. 19, 2007 (DK) ................. 2007 01824

(51) Int. Cl.
| F03D 11/00 | (2006.01) |
| B23B 27/12 | (2006.01) |
| B29C 70/38 | (2006.01) |
| B29C 70/54 | (2006.01) |
| B29C 70/20 | (2006.01) |
| B29L 31/08 | (2006.01) |
| B29C 70/44 | (2006.01) |

(52) U.S. Cl.
CPC ............ *B29C 70/382* (2013.01); *B29C 70/545* (2013.01); *B29C 70/20* (2013.01); *B29L 2031/08* (2013.01); *B29C 70/44* (2013.01)
USPC ........... 416/230; 156/256; 156/264; 156/265; 156/296

(58) Field of Classification Search
USPC .......................... 156/256, 264, 265; 416/230
See application file for complete search history.

(56) References Cited

U.S. PATENT DOCUMENTS 6,096,669 A * 8/2000 Colegrove et al. ............. 442/366
6,139,942 A * 10/2000 Hartness et al. ........... 428/298.1
(Continued)

FOREIGN PATENT DOCUMENTS

| EP | 1 844 914 | 10/2007 |
| WO | 2004/078443 | 9/2004 |
| WO | 2007/010052 | 1/2007 |

OTHER PUBLICATIONS

Caroline Foulger; International Search Report and Written Opinion issued in International Patent Application No. PCT/EP2008/067846; Apr. 17, 2009; 16 pages; European Patent Office.

(Continued)

*Primary Examiner* — Ned Landrum
*Assistant Examiner* — Ryan Ellis
(74) *Attorney, Agent, or Firm* — Wood, Herron & Evans, LLP (57) ABSTRACT

The invention provides a method for preparing a pre-form comprising at least two layers of fiber tows, these layers being at least partly fixed by a resin. The method comprising steps of providing a work surface, and alternating distribution of layers of resin and layers of fiber tows.

16 Claims, 4 Drawing Sheets

(56) References Cited

U.S. PATENT DOCUMENTS

| | | | |
|---|---|---|---|
| 7,115,180 B2 * | 10/2006 | Bruyere | 156/166 |
| 7,955,548 B2 * | 6/2011 | Buckley | 264/496 |
| 8,580,060 B2 * | 11/2013 | Bech | 156/169 |
| 2003/0138602 A1 | 7/2003 | Lorenz et al. | |
| 2005/0067731 A1 | 3/2005 | Bruyere | |
| 2006/0172636 A1 * | 8/2006 | Bech | 442/1 |

OTHER PUBLICATIONS

Robot bag bedre vindmollevinger; Aug. 30, 2005; 1 page; Industriens Dagblad.

Translation of Robot bag bedre vindmollevinger (Robot behind better wind turbine blades); Aug. 30, 2005, 2 pages; The Industry's daily.

Danish Patent Office, Search Report for PA 200701824, 1 pg, Nov. 5, 2008.

R. Wachsmuth; Select pages from Aeolus II Report; pp. 77-128; May 1992; MBB Deutsche Aerospace.

R. Wachsmuth; English translation of Rotor Blade of Composite Fiber Design for the Wind Power Installation; Aeolus II, Phase I & II; 21 pages; May 1992; Federal Ministry for Research and Technology.

Cheng-Huat Ong et al.; Document entitled The Use of Carbon Fibers in Wind Turbine Blade Design: A Seri-8 Blade Example; Mar. 2000; 79 pages; Stanford, CA.

\* cited by examiner

METHOD FOR PREPARING A PRE-FORM

TECHNICAL FIELD

The present invention relates to a method for preparing a pre-form comprising at least two layers of fiber tows being at least partly fixed by a resin.

BACKGROUND OF THE INVENTION

When making large wind turbine blades it has become practice to use semi-finished components with fibers in a layer of resin, i.e. a composite material. These semi-finished components can be called pre-forms. Depending on their structure, the components can provide strength primarily in one direction and they can therefore be used as reinforcement elements for the wind turbine blades.

Traditionally, "endless" sheets of a single layer of fibers in a resin have been manufactured as piece-goods. Subsequently, the sheets have been cut into smaller parts having the required shape and size. These parts have been stacked and laminated to achieve a finished reinforcement element; i.e. a pre-form.

Therefore, the traditional method causes generation of waste products as it is impossible to use the entire sheet when cutting it into smaller parts of required shape and size. As the sheets are expensive, the traditional method creates a high loss of value due to the size of the waste product. Furthermore, the cutting is time consuming and therefore increases manufacturing costs.

In the traditional method, the sheets are cut after having wetted the fibers in resin and this sometimes causes problems when resin adheres to the cutting device. Typically, this demands for specially designed cutting tools for cutting the wet and tacky sheets of fibers.

When stacking the pre-wetted sheets, air can be trapped between the layers. As the layers are semi-finished components with fibers in a layer of resin, it can be difficult to remove the air being trapped between the layers.

SUMMARY OF THE INVENTION

It is an object of embodiments of the present invention to provide an improved method for preparing a pre-form.

Thus, the invention provides a method for preparing a pre-form comprising at least two layers of fiber tows being at least partly fixed by a resin, the method comprising the steps of:
  providing a work surface;
  distributing a first layer of a resin onto the work surface;
  distributing a first fiber layer of individual fiber tows onto the first layer of resin;
  distributing a second layer of resin onto the first fiber layer; and
  subsequently distributing a second fiber layer of individual fiber tows onto the second layer of resin.

The method may be used to prepare a semi-finished component, i.e. a pre-form comprising at least two layers of fiber tows being at least partly fixed by a resin. The fiber tows may be arranged substantially parallel to each other and they may be fixed to each other merely by the resin which is distributed onto the work surface and onto the layers of fiber tows. Different types of fibers, such a glass fibers, carbon fibers, synthetic fibers, bio fibers, mineral fibers, and metal fibers can be used depending on the final use of the pre-form. The pre-form comprises fibers in fiber tows which are bundles of a large number of individual fibers, e.g. bundles of unidirectional fibers.

Even though the fiber tows are distributed individually onto the work surface, a plurality of fiber tows may be distributed simultaneously. Individually means that the tows are individual tows only bound to each other by the resin of the first layer onto which the tows are distributed and by the subsequently distributed layer of resin applied onto the first fiber layer.

The layer of resin and the layers of fiber tows may in particular be applied sequentially which herein means that the resin is distributed onto the work surface and the fiber tows are subsequently distributed onto the resin. Subsequently, a new layer of resin is distributed onto the fiber tows etc. The process may be continuous so that the first layer of fiber tows are distributed onto the first layer resin at a specific part of the work surface while the first layer of resin is distributed onto another part of the work surface etc.

Each fiber tow may comprise fibers which are twisted in a manner known e.g. from rope making etc. The fiber tows may contain only fibers, or it may contain fibers and a binder for binding the fibers. The binder may comprise resin, e.g. similar to that resin making up every second layer of the pre-form. The resin forming a binder for the fibers of the fiber tow may be unconsolidated, partly consolidated or completely consolidated.

The pre-form may be prepared by identical types of fiber tows. Alternatively, one layer of fiber tows may be made of e.g. carbon fiber tows, whereas another layer may be made of e.g. glass fiber tows.

The resin may be an organic polymeric liquid resin which, when converted into its final state for use, consolidates and becomes solid. As an example, the resin may be an epoxy-based resin or a polyester-based resin, though other resin types may also be applied. Furthermore, one or more different resin type may be applied for the preparation of a pre-form. If using different types of resin, it may however be an advantage to use resins of one family to ensure compatibility between them.

The work surface may be a worktable on which the pre-form is prepared. Alternatively, the work surface may be a backing layer or carrier layer on which the pre-form is prepared. In the latter case, the method may further comprise a step of providing a worktable. In particular, the work surface may be a surface of a blank of a sheet material which is releasable from the resin after the resin has been consolidated. As an example, the sheet may be a paper sheet coated with a non-stick coating, e.g. with wax etc.

The pre-form may comprise an arbitrary number of layers of fiber tows and resin depending on the use of the pre-form. The method may therefore comprise the step of providing further layers of resin and/or fiber tows until the number of layers makes the pre-form suitable for a specific purpose.

As air may be trapped in the pre-form between the layers of resin and fiber tows when distributing these layers, and since trapped air may decrease the strength of the finished pre-form and therefore may be unwanted, the method may further comprise a step of encapsulating all the layers in an enclosure and a step of removing air from the enclosure to draw out the trapped air.

The layers may be encapsulated by covering the worktable with a cover so that at least a part of the worktable forms part of the enclosure for the layers. Air may be removed through apertures in the cover.

In one embodiment, the cover may comprise three different layers. Firstly, the pre-form may be covered by a perforated separating foil. The separating foil may be made of plastic or another material with similar properties in order to limit or even avoid that the resin adheres to the separating foil. The perforation may be formed by a small needle puncturing the foil at e.g. every 1 cm$^2$ to form the required number of perforations.

Secondly, a distribution layer may cover the perforated separating foil. The distribution layer may facilitate distribution of suction so that the pressure within the enclosure becomes more homogeneous when connected to an exhauster which removes air which may have been trapped between the layers of the pre-form. As an example, the distribution layer may be made of polyester felt.

Finally, the distribution layer may be covered by a vacuum foil to ensure that the cover is substantially air-tight. As an example, the vacuum foil may be made of a plastic foil.

Subsequent to the removal of air, the pre-form may be heated in order to at least partly cure the resin. When heating the layers, the worktable may be moved to a heater so that the layers are heated while they are still arranged on the worktable. Alternatively, the pre-form may be moved to another surface on which the pre-form may be heated.

To facilitate removal of trapped air, at least one of the layers of resin may be distributed in a non-continuous layer, as it may be difficult to ensure removal of air being trapped between continuous layers of resin.

By a non-continuous layer is in this connection understood a layer which does not fully cover the fiber tows, i.e. a layer which is not a closed layer. As an example, the non-continuous layer may be formed by a zigzag-pattern, by lines, by a square-formed pattern or by another pattern leaving at least some portions of the fiber tows free of resin. The pattern may also be an arbitrary pattern leaving portions of the fiber tows free of resin.

It should further be understood, that the resin may be continuously distributed while forming a non-continuous layer, e.g. by applying the resin via a spray nozzle which is moved in a pattern whereby the aforementioned lines or similar pattern are formed.

The resin may contain components which may irritate or may be harmful when in contact with the skin of a person distributing the resin. Avoidance of direct contact with the resin may thus be desirable. Consequently, the steps of distribution the resin may advantageously be automatically or partly automatically carried out by the use of a nozzle device which may be adapted for non-continuously distribution of the resin.

At least one layer of fiber tows and one layer of resin may be provided sequentially, thus allowing for distribution of one layer of resin before distribution of one layer of fiber tows or vice versa. Sequentially therefore means that the resin is sprayed, rolled or otherwise spread directly onto the work surface or onto a fiber layer.

In one embodiment, all the layers may be provided sequentially, whereas an alternative embodiment may comprise layers which are provided sequentially and other layers which are provided simultaneously. The latter allows for the application of e.g. one or more layers of pre-pregs in the pre-form being prepared, or e.g. for distribution of fibers tows which are pre-wetted with resin or which are wetted with resin during the distribution of the fiber tows onto the work surface.

It should be understood, that a number of fiber tows may be distributed simultaneously. This may allow for preparation of pre-forms of different width. Furthermore, pre-forms of different length and shape may be prepared. Thus, the method may further comprise a step of cutting the fiber tows individually to be able to prepare pre-forms comprising fiber tows of different length.

To obtain pre-forms of different shapes, one or more fiber tows may be cut during distribution of the fiber tows, while the remaining portion of the fiber tows are still distributed.

In traditional ways of making composite materials with sheets of woven fibers and resin, the woven sheets are normally cut into a shape which matches the shape of the final product. In this case, each of those fibers extending perpendicular to a cutting line terminates at an angle being parallel to the edge of the sheet as such.

According to the present invention, the fiber tows are individual tows, and they may therefore be cut individually and in individual length. The final shape of the pre-form may therefore be determined by the length of the fiber tows.

As the fiber tows may be distributed substantially parallel to each other, each of the fiber tows may be arranged along an essentially straight line and they may all be terminated by a cut with a fixed angle to the straight line. Each of the fiber tows may e.g. be terminated in an essentially straight cut forming a cut angle in the range of 80-100 degrees to the straight line. This may be facilitated by arranging the cutting device with a fixed angle relative to the work surface, and this may also make the cutting tool simpler since it reduces the number of movable elements in the cutting tool.

In order to ensure that the fiber tows remain on the work surface in the position where they have been distributed onto the work surface and thus reduce deviations in the shape of the pre-forms, it may be an advantage to distribute a layer of resin before distributing a layer of fiber tows, as the resin may partly fix the fiber tows and prevent movement of each fiber tow relative to the other fiber tows. To enable movement of the finished pre-form, the first layer of resin may be provided on a carrier layer formed by a blank of a sheet material e.g. comprising paper or comprising a fiber material, e.g. with woven or non-woven fibers, e.g. carbon or glass fibers.

When the pre-form is used, e.g. for making a wind turbine blade, the carrier layer may be removed. However, in some applications the carrier layer may form part of the pre-form and may thus remain in the final product. For this purpose, the carrier layer may e.g. include a sheet of felt or a woven fiber material, e.g. with carbon or glass fibers.

The paper may be treated with e.g. wax or silicone to facilitate removal of the carrier layer, as it for some applications may reduce the strength of the pre-form if pieces of the carrier layer adhere to the finished pre-form.

The preparation of the pre-form may be fully or partly automatic, therefore at least one layer of resin or fiber tows may be distributed by use of a tool which is handled by a manipulator such as a robot.

As an example, the method for preparing a pre-form may be performed by an apparatus comprising:
  a work surface;
  a fiber tow distribution device comprising a plurality of distribution passages, each distribution passage being adapted for receiving and delivering a fiber tow, and the passages being arranged to provide a distribution distance between the delivered fiber tows;
  a fiber tow retention device adapted to retain a plurality of fiber tows; and
  a manipulation device adapted to move the fiber tow distribution device relative to the fiber tow retention device;
wherein the apparatus is arranged so that free ends of the fiber tows can be delivered from the fiber tow distribution device to the fiber tow retention device, and the fiber tow retention device is adapted for retention of the free ends at the distribution distance so that mutual movement of the fiber tow distribution device and the fiber tow retention device away from each other causes drawing of the fiber tows through the distribution passages and distribution of the fiber tows onto the work surface.

An apparatus for preparing a pre-form may further comprise a cutting device which is provided for cutting of the fiber tows individually. Such an apparatus may further comprise means for receiving information relating to the desired shape of the pre-form, and the cutting device may be adapted for individual cutting of the fiber tows in accordance with this information.

In one embodiment, the layers of resin and the layers of fiber tows may be distributed by use of joined tools, i.e. by joining a tool for distribution of the resin with a tool for distribution of the fiber tows, as the resin and the fiber tows may cover substantially the same area. This may allow for a simplified layout of a corresponding apparatus comprising these tools. By joining the tools, movement of the tool for distribution of resin may not require a movement pattern being independently controlled or even an independent manipulator. Furthermore, this may allow for distribution of fiber tows and resin in one work process.

By joining the tools is meant that the tools may be two separate tools which are attached to each other, thus allowing them to be moved together. Alternatively, they are joined by the aid of their control systems which may ensure that they are moved together without attaching them to each other.

At least one of the layers of resin may be distributed by spraying. As an example, the resin may be distributed under pressure through a nozzle device. The nozzle device may comprise a substantially rectangular nozzle opening allowing for lines of resin to be distributed while moving the nozzle device and opening and closing the nozzle opening during movement of the nozzle device. Alternatively, the resin may be non-continuously distributed without opening and closing the nozzle device if e.g. distributed through a perforated film or a grid comprising small openings.

A further alternative is to distribute the resin continuously in a non-continuous layer by the use of a small nozzle opening which may be movably attached to the nozzle device. By moving the nozzle opening e.g. from side to side while moving the nozzle device relative to the work surface, the resin may be distributed in a non-continuously layer forming a zigzag-like pattern. The nozzle device and the work surface may be moved relative to each other by moving at least one of them.

If the resin is distributed by spraying, at least one layer of fiber tows and one layer of resin may be provided simultaneously, e.g. by joining the tool for spraying with the tool for distribution of fiber tows. This may allow for distribution of resin simultaneously with distribution of fiber tows, e.g. by spraying the fiber tows during distribution hereof, or by spraying the work surface or a previous layer of fiber tows while distributing the fiber tows in question.

At room temperature, the resin may be in a semi-solid state. In order to be able to distribute the resin onto the work surface or onto the layers of fiber tows, it may be an advantage to heat the resin to a temperature at which the viscosity is decreased or where the resin becomes sufficiently "liquid" e.g. to be distributed by spraying. As an example, the resin may be heated to a temperature of e.g. 50-60 degrees C.

When the pre-form is made in an environment with a temperature close to room temperature, the viscosity of the resin may increase when the temperature approaches that of the room. The resin may e.g. become semi-solid.

This partial solidification may prevent the fiber tows from becoming completely wetted before removal of the air trapped between the layers. If wetting the fiber tows, the resin may be transferred from a non-continuous layer to a substantial continuous layer, and thus impede the removal of air.

As the pre-form may be heated after removal of the trapped air, the resin may be sufficiently thin to allow the resin to get into contact with the individual fibers comprised in the fiber tows to wet the fiber tows. During heating of the pre-form, the temperature may be raised to a temperature above a first curing temperature allowing for a first curing process to take place.

Subsequently, the pre-form may be cooled again to obtain a semi-solid pre-form. The pre-forms may be stored in this semi-finished state until application hereof, e.g. in wind turbine component such as a blade. When preparing the final component, the component and thus the semi-solid pre-form may be heated to a temperature above a second curing temperature allowing for a second curing process to take place in order to finish curing of the pre-form.

BRIEF DESCRIPTION OF THE DRAWINGS

Embodiment of the invention will now be further described with reference to the drawings, in which.

DETAILED DESCRIPTION OF THE DRAWINGS

Figure 1:
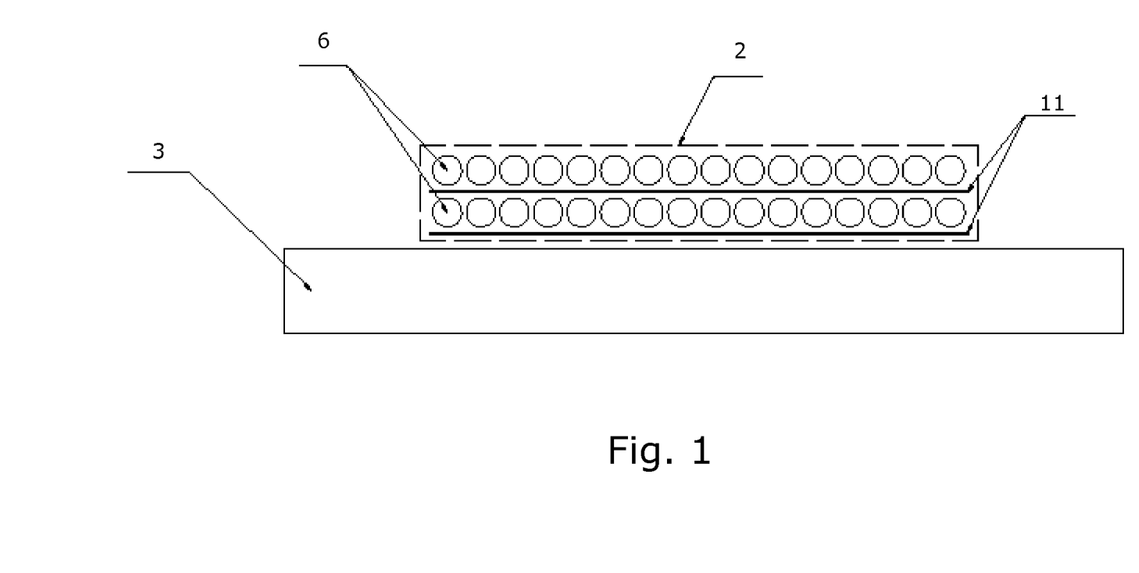
FIG. 1 illustrates a pre-form.

FIG. 1 illustrates a pre-form 2 which in the present embodiment comprises two layers of fiber tows 6 being at least partly fixed by a resin. Each layer of fiber tows 6 is partly fixed in a layer of resin 11.

Figure 2:
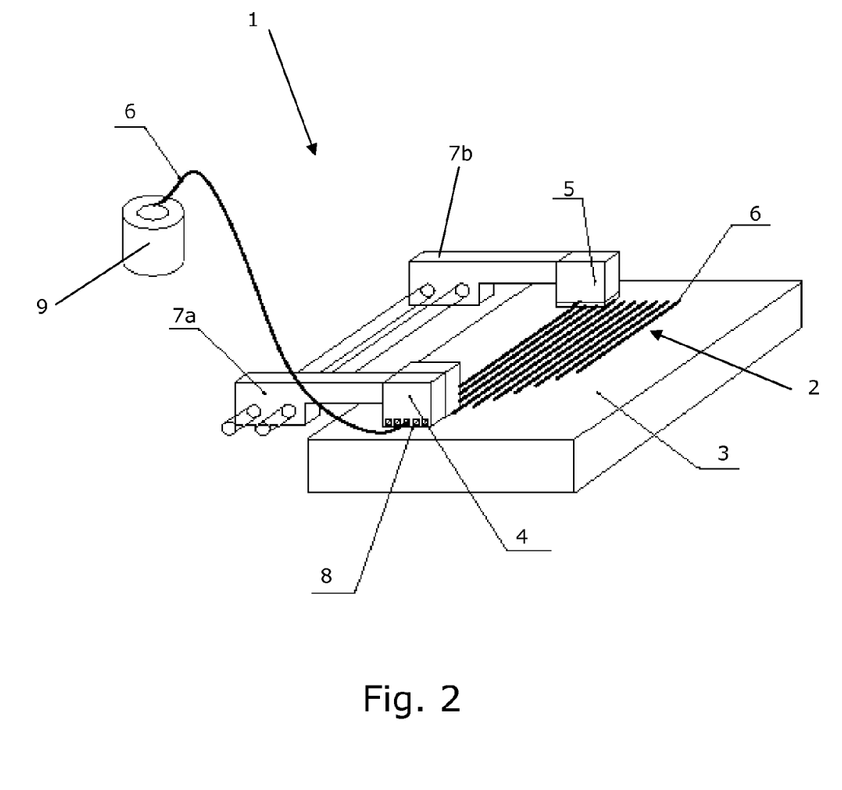
FIG. 2 illustrates an apparatus for preparing a pre-form.
Figure 3:
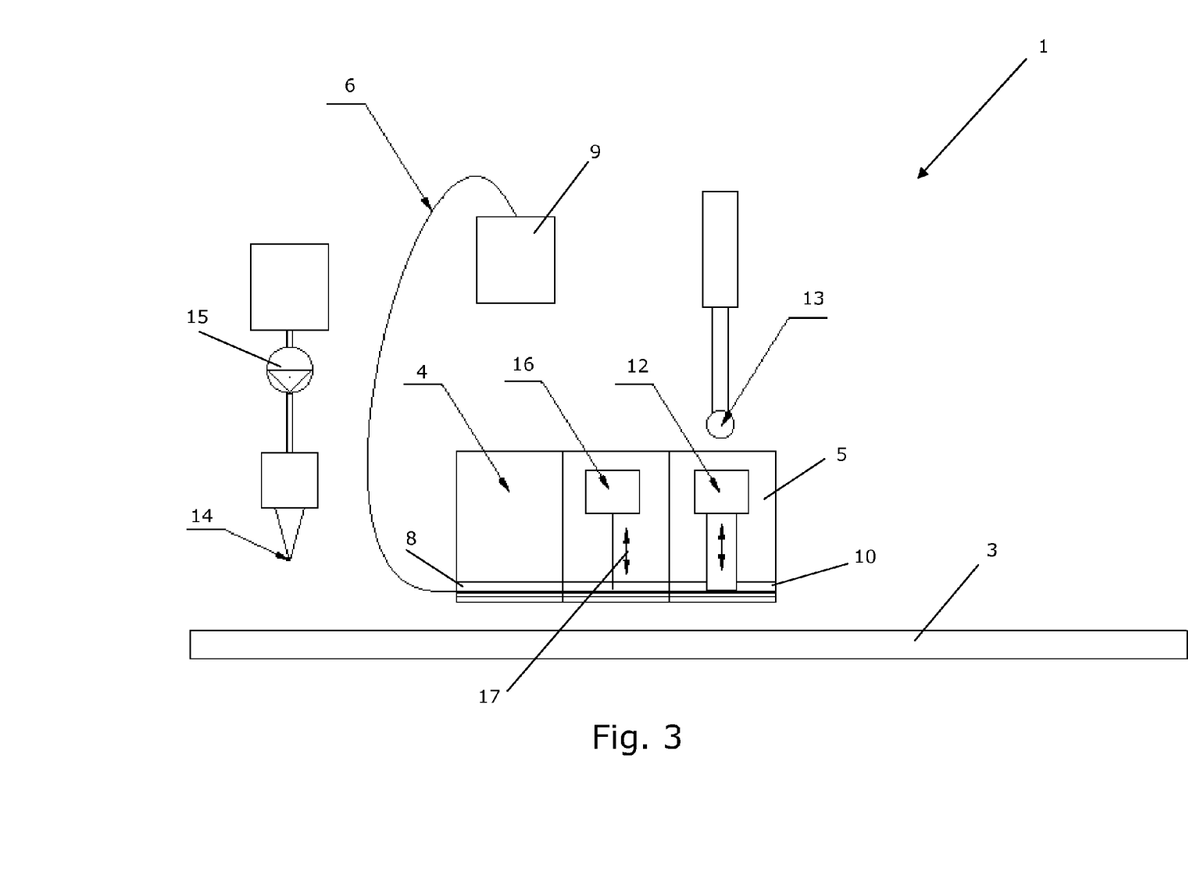
FIG. 3 illustrates an apparatus for preparing a pre-form ready to distribute fiber tows.
Figure 4:
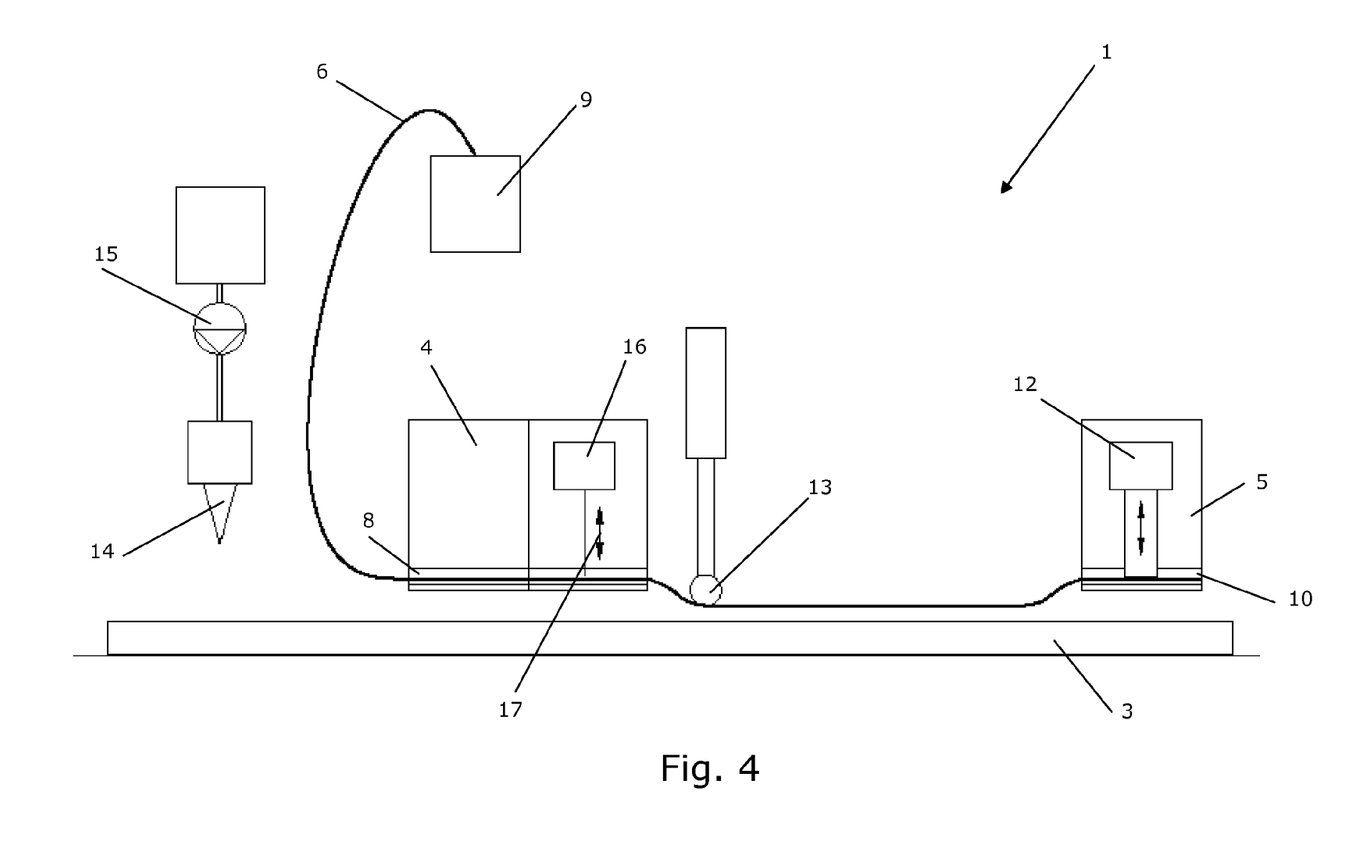
FIG. 4 illustrates an apparatus for preparing a pre-form during distribution of fiber tows.

FIGS. 2, 3 and 4 illustrate an embodiment of an apparatus 1 for preparing a pre-form 2 by the claimed method.

FIG. 2 illustrates an apparatus 1 for preparing a pre-form 2 (only the uppermost layer hereof is shown). The apparatus 1 comprises a work surface 3, a fiber tow distribution device 4, a fiber tow retention device 5 adapted to retain a plurality of fiber tows 6, and a manipulation device 7 which is adapted to move the fiber tow distribution device 4 relative to the fiber tow retention device 5.

The first part of the manipulation device 7a is adapted to move the fiber tow distribution device 4, whereas the second part of the manipulation device 7b is adapted to move the fiber tow retention device 5. A third part of the manipulation device (not shown) is adapted to move the work surface 3.

The fiber tow distribution device 4 comprises a plurality of distribution passages 8 (for illustration purposes only some of them are shown). Each distribution passage 8 is adapted for receiving and delivering a fiber tow 6, and the distribution passages 8 are arranged to provide a distribution distance between the delivered fiber tows 6.

The apparatus 1 is arranged so that free ends of the fiber tows 6 can be delivered from the fiber tow distribution device 4 to the fiber tow retention device 5. The fiber tow retention device 5 is adapted for retention of the free ends so that mutual movement of the fiber tow distribution device 4 and the fiber tow retention device 5 away from each other causes drawing of the fiber tows 6 and distribution hereof onto the work surface 3.

In the illustrated embodiment, the work surface 3 is a table on which the pre-form 2 is prepared.

The fiber tow distribution device 4 is adapted for receiving and delivering of a plurality of fiber tows 6. In the illustrated embodiment, the fiber tows 6 are coiled and the coils 9 are positioned above the distribution device 4 so that delivering of fiber tows 6 to the fiber tow distribution device 4 uncoils the coils 9. As each of the distribution passage 8 may receive a fiber tow 6, a coil 9 exists for each of the distribution passages 8. For illustration purposes, only one of the coils 9 is illustrated FIG. 1.

In order to be able to retain each of the free ends of the fiber tows 6 separately, the fiber tow retention device 5 comprises one retention opening 10 (see FIGS. 3 and 4) corresponding to each distribution passage 8 of the fiber tow distribution device 4. However, not all retention openings 10 and distribution passages 8 need constantly be in use. Depending on the size and shape of the pre-form 2 to be prepared at variable number of the retention openings 10 and distribution passages 8 may be used.

FIG. 3 illustrates an apparatus 1 for preparing a pre-form 2, which apparatus 1 is ready to distribute fiber tows 6. The apparatus 1 is arranged so that the retention openings 10 and the distribution passages 8 can be aligned to form a plurality of continuous passages for the fiber tows 6. In the illustrated embodiment, this is done by moving the retention device 5 towards the distribution device 4, and thus bringing them in connection with each other.

The retention openings 10 are arranged with a mutual retention distance corresponding to a mutual distance of the distribution passages 8. This allows for substantial parallel drawing of the fiber tows 6 through the distribution passages 8. Furthermore, substantially parallel distribution of the fiber tows 6 onto the work surface 3 is facilitated.

In order to retain the free ends in the retention openings 10, the fiber tow retention device 5 further comprises a retention lock 12 being adapted to lock the free ends in the retention openings 10. The retention lock 12 is able to lock all the free ends and is able to lock a selected number of the free ends of the fiber tows 6.

To limit inaccuracy when distributing the fiber tows 6 onto the work surface 3 and further facilitate drawing of the fiber tows 6 through the distribution passages 8, the apparatus 1 comprises a fiber tow bar 13 which is adapted to press at least a portion of each of the fiber tows 6 downwardly towards the work surface 3 during distribution of the fiber tows 6. As illustrated, the fiber tow bar 13 is raised above the retention device 5 in a stand by position. The fiber tow bar 13 will be lowered to press the fiber tows 6 towards a layer of resin 11 (not shown in FIG. 3) on the work surface 3, when distribution of the fiber tows 6 starts. In FIG. 4 the fiber tow bar 13 is illustrated in active position.

Furthermore, the apparatus 1 comprises a nozzle device 14 which is adapted for distribution of resin onto the work surface 3. In the illustrated embodiment, the nozzle device 14 is adapted for distribution of the resin in a non-continuous layer, thus facilitating exhaustion of air from the pre-form 2.

The nozzle device 14 comprises a small nozzle opening allowing for lines of resin to be distributed while moving the nozzle device 14 relative to the length of the work surface 3 and simultaneously moving the nozzle opening from one side to the other relative to the width of the work surface 3. The amount of resin distributed is controlled by the nozzle pump 15. The relative movement of the nozzle device 14 and the work surface 3 is carried out either by moving the work surface by the third manipulation device or by moving the nozzle device 14 by the first manipulation device 7a as the nozzle device 14 can be moved together with the fiber tow distribution device 4.

As the apparatus 1 is adapted for preparing pre-forms 2 of different shapes, different sizes, and different thicknesses, the apparatus 1 comprises a cutting device 16 which is provided for cutting of the fiber tows 6 individually.

As illustrated in FIG. 1, one layer of fiber tows 6 may form a substantially trapezoid shape. In order to form a pre-form 2 of a substantially trapezoid shape, it is an advantage to be able to use fiber tows 6 of different length and thus be able to cut the fiber tows 6 individually to terminate the fiber tows 6 at different positions along the length hereof.

As indicated by the arrow 17 in FIG. 3, the fiber tows 6 are cut by lowering the cutting device 16 to cut each of the fiber tows 6 individually. After cutting of a fiber tow 6, the cutting device 16 is raised and moved perpendicular to the distribution direction to be ready for cutting of another fiber tow 6. Thereby, one or more of the fiber tows 6 can be cut during distribution hereof, while the remaining portion of the fiber tows 6 are still distributed onto the work surface 3.

FIG. 4 illustrates an apparatus 1 for preparing a pre-form 2 during distribution of fiber tows 6. As illustrated, the fiber tows 6 are being distributed by moving the fiber tow retention device 5 away from the fiber tow distribution device 4, while pressing the fiber tows 6 towards the work surface 3 by the use of the fiber tow bar 13.

The invention claimed is:

1. A method for preparing a pre-form comprising at least two layers of fiber tows being at least partly fixed by a resin, the method comprising:
    providing a work surface;
    fixing a first end of the fiber tows to a first device;
    coupling the fiber tows to a second device such that the fiber tows are able to move relative to the second device;
    distributing a first layer of a resin onto the work surface;
    distributing a first fiber layer of individual fiber tows onto the first layer of resin by moving the first and second devices relative to each other;
    distributing a second layer of resin onto the first fiber layer; and
    distributing a second fiber layer of individual fiber tows onto the second layer of resin by moving the first and second devices relative to each other.

2. The method according to claim 1, comprising providing further layers of resin and/or fiber tows.

3. The method according to claim 1, wherein at least one of the layers of resin is distributed in a non-continuous layer.

4. The method according to claim 1, wherein the resin is heated before distribution hereof.

5. The method according to claim 1, wherein at least one layer of fiber tows and one layer of resin are provided sequentially.

6. The method according to claim 1, wherein the first layer of resin is provided on a carrier layer formed by a blank of a sheet material.

7. The method according to claim 1, wherein at least one layer of resin or fiber tows is distributed by use of a tool which is handled by a robot manipulator.

8. The method according to claim 1, wherein the layers of resin and the layers of fiber tows are distributed by use of joined tools.

9. The method according to claim 1, wherein at least one of the layers of resin is distributed by spraying.

10. The method according to claim 1, wherein all layers of fiber tows comprise identical tows.

11. The method according to claim 1, further comprising cutting the individual fiber tows to terminate a fiber layer.

12. The method according to claim 11, wherein cutting the individual fiber tows further comprises cutting the individual fiber tows such that at least two tows have different lengths.

13. The method according to claim 11, further comprising:
fixing another first end of the fiber tows to the first device;
distributing another layer of a resin onto the preceding fiber layer; and
distributing another fiber layer of individual fiber tows onto the another layer of resin by moving the first and second devices relative to each other.

14. The method according to claim 1, wherein moving the first and second devices relative to each other further comprises holding the second device substantially stationary and moving the first device away from the second device.

15. A method for preparing a pre-form comprising at least two layers of fiber tows being at least partly fixed by a resin, the method comprising:
providing a work surface;
fixing a first end of the fiber tows to a first device;
coupling the fiber tows to a second device such that the fiber tows are able to move relative to the second device;
distributing a first fiber layer of individual fiber tows onto the work surface by moving the first and second devices relative to each other;
distributing a layer of resin onto the first fiber layer; and
distributing a second fiber layer of individual fiber tows onto the layer of resin by moving the first and second devices relative to each other.

16. A method for preparing a pre-form comprising at least two layers of fiber tows being at least partly fixed by a resin, the method comprising:
fixing a first end of the fiber tows to a first device;
coupling the fiber tows to a second device such that the fiber tows are able to move relative to the second device;
distributing a fiber layer of individual fiber tows by moving the first and second devices relative to each other;
distributing a layer of resin onto the fiber layer; and
distributing another fiber layer of individual fiber tows onto the layer of resin by moving the first and second devices relative to each other.

\* \* \* \* \*